(12) United States Patent  
Selander et al.

(10) Patent No.: US 10,909,861 B2  
(45) Date of Patent: Feb. 2, 2021

(54) UNMANNED AERIAL VEHICLE IN CONTROLLED AIRSPACE

(71) Applicant: TELEFONAKTIEBOLAGET LM ERICSSON (PUBL), Stockholm (SE)

(72) Inventors: Göran Selander, Bromma (SE); Tommy Arngren, Södra Sunderbyn (SE); Joel Ståhl, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 298 days.

(21) Appl. No.: 15/752,446

(22) PCT Filed: Dec. 23, 2016

(86) PCT No.: PCT/SE2016/051317  
§ 371 (c)(1),  
(2) Date: Feb. 13, 2018

(87) PCT Pub. No.: WO2018/052352  
PCT Pub. Date: Mar. 22, 2018

(65) Prior Publication Data  
US 2019/0012922 A1  Jan. 10, 2019

(51) Int. Cl.  
*G08G 5/00* (2006.01)  
*B64C 39/02* (2006.01)  
*H04W 4/021* (2018.01)

(52) U.S. Cl.  
CPC ........... *G08G 5/006* (2013.01); *B64C 39/024* (2013.01); *G08G 5/0013* (2013.01);  
(Continued)

(58) Field of Classification Search  
CPC .......... B64C 2201/14; B64C 2201/141; B64C 2201/146; B64C 39/024; G08G 5/0013;  
(Continued)

(56) References Cited

U.S. PATENT DOCUMENTS 8,538,673 B2 * 9/2013 Sislak .................. G08G 5/0008  
701/301  
8,543,255 B2 * 9/2013 Wood .................. G05D 1/0088  
701/2

(Continued)

FOREIGN PATENT DOCUMENTS

CN 101939622 A 1/2011  
CN 104836640 A 8/2015  
(Continued)

OTHER PUBLICATIONS

International Search Report and Written Opinion issued in Application No. PCT/SE2016/051317 dated Oct. 2, 2017, 9 pages.  
(Continued)

*Primary Examiner* — Babar Sarwar  
(74) *Attorney, Agent, or Firm* — Rothwell, Figg, Ernst & Manbeck, P.C.

(57) ABSTRACT

A method performed by an unmanned aerial vehicle, UAV (10), or a remote control (30) for the UAV, for executing an operating session for the UAV in controlled airspace, comprises the steps of transmitting a request for permission to operate in the airspace to an airspace authority function (20) and receiving a reply to the request. If permission to operate is granted, the following steps are performed: receiving a message comprising information about a space-time region of airspace to operate in, monitoring a position of the UAV in space and time, and, if the position of the UAV is within the region and the UAV is either within a predetermined distance from a geographical border of the region, or predicted to reach the geographical border of the region within a predetermined time, activating assisted control of the UAV to keep the UAV within the region.

20 Claims, 13 Drawing Sheets

(52) U.S. Cl.
CPC ......... *G08G 5/0026* (2013.01); *G08G 5/0034* (2013.01); *G08G 5/0043* (2013.01); *G08G 5/0069* (2013.01); *H04W 4/021* (2013.01); *B64C 2201/14* (2013.01); *B64C 2201/141* (2013.01); *B64C 2201/146* (2013.01)

(58) Field of Classification Search
CPC .. G08G 5/0026; G08G 5/0034; G08G 5/0043; G08G 5/006; G08G 5/0069; H04W 4/021
See application file for complete search history.

(56) References Cited

U.S. PATENT DOCUMENTS

| | | | | |
|---|---|---|---|---|
| 8,755,950 | B2* | 6/2014 | Johansson | G05D 1/0022 701/2 |
| 9,087,451 | B1 | 7/2015 | Jarrell | |
| 9,164,506 | B1* | 10/2015 | Zang | G06K 9/0063 |
| 9,256,994 | B2* | 2/2016 | Downey | B64C 39/024 |
| 9,412,278 | B1* | 8/2016 | Gong | G08G 5/0091 |
| 9,422,055 | B1* | 8/2016 | Beckman | B64C 39/024 |
| 9,609,288 | B1* | 3/2017 | Richman | G06K 9/00637 |
| 9,875,657 | B2* | 1/2018 | Collins | G08G 5/0008 |
| 10,023,151 | B2* | 7/2018 | Samadani | G06F 21/00 |
| 10,181,729 | B1* | 1/2019 | DeVaul | H02J 50/80 |
| 10,313,638 | B1* | 6/2019 | Yeturu | G06K 9/00637 |
| 10,665,110 | B2* | 5/2020 | Collins | G01S 13/933 |
| 2012/0041951 | A1 | 2/2012 | Sauvalle et al. | |
| 2014/0018979 | A1* | 1/2014 | Goossen | G05D 1/0044 701/3 |
| 2014/0032034 | A1* | 1/2014 | Raptopoulos | G05D 1/0088 701/25 |
| 2015/0153740 | A1* | 6/2015 | Ben-Shachar | B64C 39/024 701/16 |
| 2015/0254988 | A1* | 9/2015 | Wang | B64D 47/08 701/3 |
| 2015/0323930 | A1* | 11/2015 | Downey | G08G 5/006 701/2 |
| 2016/0035224 | A1* | 2/2016 | Yang | G08G 5/0078 701/23 |
| 2016/0189549 | A1* | 6/2016 | Marcus | G08G 5/0039 701/3 |
| 2016/0217694 | A1* | 7/2016 | Batla | G08G 5/0013 |
| 2016/0240087 | A1 | 8/2016 | Kube et al. | |
| 2016/0244187 | A1* | 8/2016 | Byers | A47G 29/14 |
| 2016/0327956 | A1* | 11/2016 | Zhang | G05D 1/005 |
| 2016/0358432 | A1* | 12/2016 | Branscomb | H04L 9/088 |
| 2017/0187993 | A1* | 6/2017 | Martch | G01S 1/00 |
| 2017/0255194 | A1* | 9/2017 | Poornachandran | G08G 5/006 |
| 2018/0025649 | A1* | 1/2018 | Contreras | G05D 1/0061 701/3 |
| 2018/0068567 | A1* | 3/2018 | Gong | G08G 5/0034 |
| 2018/0111683 | A1* | 4/2018 | Di Benedetto | G06Q 30/04 |
| 2018/0120829 | A1* | 5/2018 | Price | B64C 27/20 |
| 2018/0165971 | A1 | 6/2018 | Chen | |
| 2018/0188747 | A1* | 7/2018 | Venturelli | G06Q 10/08 |
| 2018/0253979 | A1* | 9/2018 | Rey | G08G 5/0069 |
| 2018/0275654 | A1* | 9/2018 | Merz | G08G 5/0086 |
| 2018/0356841 | A1* | 12/2018 | Zilberstein | G05D 1/104 |
| 2019/0147747 | A1* | 5/2019 | Arngren | G08G 5/0026 701/2 |
| 2019/0212751 | A1* | 7/2019 | Zhou | G06K 9/00637 |

FOREIGN PATENT DOCUMENTS

| | | |
|---|---|---|
| CN | 105206114 A | 12/2015 |
| WO | 2016154949 A1 | 10/2016 |

OTHER PUBLICATIONS

Camhi, J., "Market Forecasts, Key Players and Use Cases, and Regulatory Bafflers to the Proliferation of Drones", BI Intelligence, The Drones Report, Mar. 2016, 21 pages.

Jones, M. et al., "JSON Web Token (JWT)", Internet Engineering Task Force (IETF), Request for Comments: 7519, Category: Standard Track, ISSN: 2070-1721, May 2015, 30 pages.

D. Hardt, Ed., "The OAuth 2.0 Authorization Framework", Internet Engineering Task Force (IETF), Request for Comments: 6749, Obsoletes: 5849, Category: Standard Track, ISSN: 2070-1721, Oct. 2012, 76 pages.

ARM, "ARM TrustZone, a system-wide approach to security", http://www.arm.com/products/security-on-arm/trustzone, retrieved on Oct. 6, 2016, 3 pages.

Nichols, G., "An air traffic control system for drones?", http://www.zdnet.com/article/an-air-traffic-control-system-for-drones/, retrieved on Oct. 6, 2016, 4 pages.

Global Platform, "GlobalPlatform made simple guide: Trusted Execution Environment (TEE) Guide", http://www.globalplatform.org/mediaguidetee.asp, retrieved on Oct. 6, 2016, 6 pages.

Seitz, L. et al., Authentication and Authorization for Constrained Environments (ACE), draft-ietf-ace-oauth-authz-01, ACE Working Group, Intended Status: Standard Track, Jun. 10, 2016, 53 pages.

Wahlstroem, E. et al., "CBOR Web Token (CWT)", draft-ietf-ace-cbor-web-token-01, ACE Working Group, Internet status: Informational, Jul. 7, 2016, 16 pages.

http://www.cio.com/article/2980191/dji-is-concemed-amazon-and-google-could-restrict-hobby-drone-flight.html, Jun. 23, 2016, 12 pages.

Chinese Search Report issued in Application No. 201680055175X dated Nov. 22, 2018, 2 pages.

The European Search Report issued in Application No. 16916333.4 dated Sep. 14, 2018, 4 pages.

\* cited by examiner

UNMANNED AERIAL VEHICLE IN CONTROLLED AIRSPACE

CROSS REFERENCE TO RELATED APPLICATION(S)

This application is a 35 U.S.C. § 371 National Stage of International Patent Application No. PCT/SE2016/051317, filed Dec. 23, 2016, designating the United States, the disclosure of which is incorporated by reference.

TECHNICAL FIELD

The proposed technology generally relates to an unmanned vehicle, in particular to an unmanned aerial vehicle in controlled airspace.

BACKGROUND

There are different examples of unmanned autonomous, semi-autonomous or remotely operated vehicles. When it comes to flying unmanned vehicles, like Unmanned Ariel Vehicles (UAVs), there are two major categories. One category includes UAVs that fly beyond the visual line of sight, like Google's Project Wing and Amazon's Prime Air. Another category includes UAVs that are operated remotely and within line of sight, like Phantom Dji, Parrot AR Drone, etc.

The popularity of consumer UAVs is growing rapidly. According to the business technology news website ZDNet (http://www.zdnet.com/article/an-air-traffic-control-system-for-drones/, retrieved 6 Oct. 2016), Phantom Dji is selling about 30 000 UAVs per month. The UAVs can be used for high-profile business cases—such as the Amazon retail delivery drones, Coke refresh delivery drones or the Domino's pizza delivery drones—but there are also everyday use cases that extend from filmmaking and aerial photography to fields such as real estate, farming and pipeline maintenance. Journalists want to work with them. As do meteorologists. Also, consumers may use UAVs to take amazing vacation pictures, or sneak-peeking into neighbors' pool areas, etc.

There are legal regulations and systems related to the control of national airspace, flight control systems or air traffic management systems.

There is work ongoing to solve the issue of handling thousands of new aircrafts in the national airspace. One example is the Pathfinder, an Unmanned Aerial System Traffic Management, called LATAS (Low Altitude Traffic and Airspace Safety system) provided by PrecisionHawk, Verizon et al. that use cellular network and satellites for airspace management.

The Federal Aviation Administration (FAA) has launched a consumer drone registry that help law enforcement to identify and track drones that fly into prohibited airspace, see The Drones Report, Jonathan Camhi, March 2016.

The airspace consists of controlled airspace and uncontrolled airspace. To enter controlled airspace a clearance from Air Traffic Control (ATC) is required. As controlled airspace can cover all or a large part of a city in case of an airport close to the city center, anything taking to the air within many urban areas requires clearance. However, in many countries flight is not permitted at less than 1000 ft over populated areas with the exception for take-off and landing.

For manned aircraft flying under both visual flight rules (VFR) and instrument flight rules (IFR) a flight plan, which is submitted to a Flight Planning Centre (FPC), is a prerequisite for obtaining a clearance for flight into controlled airspace. For local VFR a prior notice may be sufficient. The clearance is given over the radio by ATC to the aircrew and is valid for the aircraft mentioned in the clearance. The clearance specifies the transponder code to be used and either flight parameters in detail (altitude, direction, limit of clearance, etc.) or a pre-defined procedure such as a standard instrument departure (SID) or a standard terminal arrival route (STAR) in case of IFR. In either case the clearance defines a trajectory in time and space. Exceptions to this rule are e.g. sectors dedicated for aerobatic flight, flight by gliders or military air activity, where a box of air is reserved for a particular aircraft or group of aircraft. Major airspace restrictions are published through the NOTAM (Notice to Airmen) service.

U.S. Pat. No. 9,256,994-B2 describes a method for e.g. authorizing unpiloted aerial vehicles by governmental organizations/companies and involves providing generated response to unmanned aerial vehicles indicating approval of request for an updated geofence envelope by a cloud system.

Patent application CN-104836640-A discloses a distributed cooperative communication method for an unmanned plane formation. The unmanned planes are forming into teams and establishing a communication mechanism, keeping formation unchanged when the unmanned plane formation is in flight, and acquiring navigation information and object information. When the distance between the unmanned plane formation and a ground mobile reception station is smaller than a distance L, the unmanned plane formation forms a virtual multi-antenna array. The unmanned plane formation and the ground mobile reception station are communicating by using a virtual multiple input multiple output (MIMO) technology.

LATAS stands for Low Altitude Tracking and Avoidance System and is an onboard system that provides flight planning, tracking and avoidance for every drone in the sky using real-time flight data transmission based on existing world-wide cellular networks. Developed to be plug and play or integrated into a UAV's circuit during manufacturing, LATAS is small (3×2×1 in), light (≈100 g) and operational on network speeds as low as 2G.

Google and Amazon want to provide a service for UAV control. Amazon has put forward the idea of a high-speed drone zone between 200 and 400 feet altitude that would be solely for drones under automatic control. Google proposed that all airspace under 500 feet be reserved for drones with transponders that continually broadcast their location and take orders from a computerized air traffic control system. Tracking of flights is then done via secondary radar and transponders. The radar emits a pulse with a query and the transponder replies. Many different classes of transponders exist. The most basic one only return the four digits of the transponder code. More advanced units also return pressure altitude, aircraft identity etc. A limitation is that the transponder must be turned on for a secondary radar unit to be able to observe the aircraft. Failure to do so—or purposefully keeping it turned off—makes the aircraft invisible to Air Traffic Control.

Still, there is a need for reliable methods for managing operation of UAVs in controlled airspace.

SUMMARY

It is an object to extend the possibility to manage the operation of an unmanned aerial vehicle (UAV) in controlled airspace.

These and other objects are met by embodiments of the proposed technology.

According to a first aspect, there is provided a method performed by an unmanned aerial vehicle, UAV, or a remote control for the UAV, the remote control communicating with and controlling the UAV through control commands, for executing an operating session for the UAV in controlled airspace. The method comprises a step of transmitting a request for permission to operate in the controlled airspace to an airspace authority function and a step of receiving a reply to the request for permission to operate from the airspace authority function. If permission to operate is granted, the following steps are performed: a step of receiving a message comprising information about a space-time region of airspace to operate in from the airspace authority function, where the space-time region is defined as at least one portion of the controlled airspace varying with time, a step of monitoring a position of the UAV in space and time, and, if the position of the UAV is within the space-time region and the UAV is either within a predetermined distance from a geographical border of the space-time region, or predicted to reach the geographical border of the space-time region within a predetermined time, and a step of activating, directly or after a predetermined time, assisted control of the UAV to assist an operator of the UAV in keeping the UAV within the space-time region According to a second aspect, there is provided a method for enabling execution of an operating session for a UAV in controlled airspace. The method comprises a step of evaluating a request for permission to operate in the controlled airspace upon receiving such a request from a UAV or a remote control for the UAV, and a step of transmitting a reply to the request for permission to operate to the UAV or the remote control for the UAV. If permission to operate is granted, the following steps are performed: a step of allocating a space-time region of airspace for the UAV to operate in, where the space-time region is defined as at least one portion of the controlled airspace varying with time, and a step of transmitting a message comprising information about the space-time region to the UAV or the remote control for the UAV.

According to a third aspect, there is provided an apparatus in an unmanned aerial vehicle, UAV, or a remote control for the UAV, configured to execute an operating session for the UAV in controlled airspace, where the apparatus is configured to transmit a request for permission to operate in the controlled airspace to an airspace authority function, and to receive a reply to the request for permission to operate from the airspace authority function. The apparatus is further configured to do the following if permission to operate is granted: receive a message comprising information about a space-time region of airspace to operate in from the airspace authority function, where the space-time region is defined as at least one portion of the controlled airspace varying with time, to monitor a position of the UAV in space and time, and to activate, directly or after a predetermined time, assisted control of the UAV to assist an operator of the UAV in keeping the UAV within the space-time region if the position of the UAV is within the space-time region and the UAV is either within a predetermined distance from a geographical border of the space-time region, or predicted to reach the geographical border of the space-time region within a predetermined time.

According to a fourth aspect, there is provided an unmanned aerial vehicle comprising such an apparatus.

According to a fifth aspect, there is provided an apparatus configured to enable execution of an operating session for an unmanned aerial vehicle, UAV, in controlled airspace, where the apparatus is configured to evaluate a request for permission to operate in the controlled airspace upon receiving such a request from a UAV or a remote control for the UAV, and to transmit a reply to the request for permission to operate to the UAV or the remote control for the UAV. The apparatus is further configured to do the following if permission to operate is granted: allocate a space-time region of airspace for the UAV to operate in, where the space-time region is defined as at least one portion of the controlled airspace varying with time, and to transmit a message comprising information about the space-time region to the UAV or the remote control for the UAV.

According to a sixth aspect, there is provided a computer program for executing, when executed by a processor, an operating session for an unmanned aerial vehicle, UAV, in controlled airspace, where the computer program comprises instructions, which when executed by the processor, causes the processor to prepare a request for permission to operate in the controlled airspace for transmission to an airspace authority function, process a reply to the request for permission to operate received from the airspace authority function, and, if permission to operate is granted, do the following: process a message comprising information about a space-time region of airspace to operate in received from the airspace authority function, where the space-time region is defined as at least one portion of the controlled airspace varying with time, monitor a position of the UAV in space and time; and activate, directly or after a predetermined time, assisted control of the UAV to assist an operator of the UAV in keeping the UAV within the space-time region if the position of the UAV is within the space-time region and the UAV is either within a predetermined distance from a geographical border of the space-time region, or predicted to reach the geographical border of the space-time region within a predetermined time.

According to a seventh aspect, there is provided a computer program for enabling, when executed by a processor, execution of an operating session for an unmanned aerial vehicle, UAV, in controlled airspace, wherein the computer program comprises instructions, which when executed by the processor, causes the processor to evaluate a request for permission to operate in the controlled airspace upon receiving such a request from a UAV or a remote control for the UAV, prepare a reply to the request for permission to operate for transmission to the UAV or the remote control for the UAV, and, if permission to operate is granted, do the following: allocate a space-time region of airspace for the UAV to operate in, where the space-time region is defined as at least one portion of the controlled airspace varying with time; and prepare a message comprising information about the space-time region for transmission to the UAV or the remote control for the UAV.

According to an eighth aspect, there is provided an apparatus in an unmanned aerial vehicle, UAV, or a remote control for the UAV, for executing an operating session for the UAV in controlled airspace. The apparatus comprises a transmission module for transmitting a request for permission to operate in the controlled airspace to an airspace authority function, a reception module for receiving, from the airspace authority function, a reply to the request for permission to operate, and, if permission to operate is granted, a message comprising information about a space-time region of airspace to operate in, where the space-time region is defined as at least one portion of the controlled airspace varying with time. The apparatus further comprises a monitoring module for monitoring, if permission to operate is granted, a position of the UAV in space and time, and an assisted control module for assisting, if permission to operate is granted, an operator of the UAV in keeping the UAV within the space-time region, the assisted control module being activated, directly or after a predetermined time, if the position of the UAV is within the space-time region and if the UAV is either within a predetermined distance from a geographical border of the space-time region, or predicted to reach the geographical border of the space-time region within a predetermined time.

According to a ninth aspect, there is provided an apparatus for enabling execution of an operating session for an unmanned aerial vehicle, UAV, in controlled airspace, where the apparatus comprises an evaluating module for evaluating a request for permission to operate in the controlled airspace upon receiving such a request from a UAV or a remote control for the UAV, a transmission module for transmitting, to the UAV or the remote control for the UAV, a reply to the request for permission to operate, and, if permission to operate is granted, a message comprising information about a space-time region of airspace for the UAV to operate in, where the space-time region is defined as at least one portion of the controlled airspace varying with time. The apparatus further comprises an allocating module for allocating, if permission to operate is granted, the space-time region of airspace for the UAV to operate in.

Some advantages of the proposed solution are:
Airspace usage by UAVs is enabled to be integrated with the pre-existing system for air traffic control. This would reduce or eliminate UAV airspace infringements which today cause airport closures which can have ripple effects on air traffic flow on a multinational scale.
UAVs would be enabled to have a legal and safe way to use urban airspace. UAVs used for medical emergencies can then be given priority and safe passage even through airspace used by commercial air traffic.
Flying with UAVs does not require a driver's license. This solution increases protection against malicious or ignorant UAV pilots.
Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

As described in the background section, there is a need for reliable methods for managing operation of UAVs in controlled airspace. Controlled airspace is airspace of defined dimensions within which Air Traffic Control (ATC) services are provided. The level of control varies with different classes of airspace.

Some of the problems with existing solutions are:
Drones are not integrated in the Air Traffic Control system. More or less informal ways of handling drone flight in controlled airspace have been deployed. As a drone operator you may be required to call the nearest Air Traffic Control and get their blessing for operating for a certain time in a certain area. There is no flight planning system available and there is no enforcing mechanism for the clearance given. There is no mechanism to prevent drones with or without clearance to enter parts of the controlled airspace that can endanger commercial air traffic. This leads to airport closures, delays and large costs.
In addition to drones inflicting on operated air traffic, drones may also collide with other drones or buildings/objects which in turn can cause damage on property or people. This remains true also for the case of a certain airspace being reserved for drones only.
There is a large interest in deploying drones for various services which will make the intended airspace a scarce resource and the security margins will go down.
While transponders could provide information of the whereabouts of drones, managing drone trajectories by remotely controlled directions from air traffic control is not a robust solution. Sudden changes in drone trajectories may put them on a collision course. Intermittent connectivity may prevent critical evasive action orders from reaching the drones.

The solution currently proposed concerns, e.g. a method and a system, see FIG. 1, for an airspace authority function 20 (abbreviated ASA in the following) to manage the flight of a UAV 10 in controlled airspace by allocating a space-time region of the airspace for the UAV to fly in. The position of the UAV is monitored in space and time, and if the UAV is approaching a border of the allocated space-time region, an assisted control function is activated to ensure that the UAV stays within the space-time region. The assisted control of the UAV may be activated directly or after a predetermined time.

Figure 1:
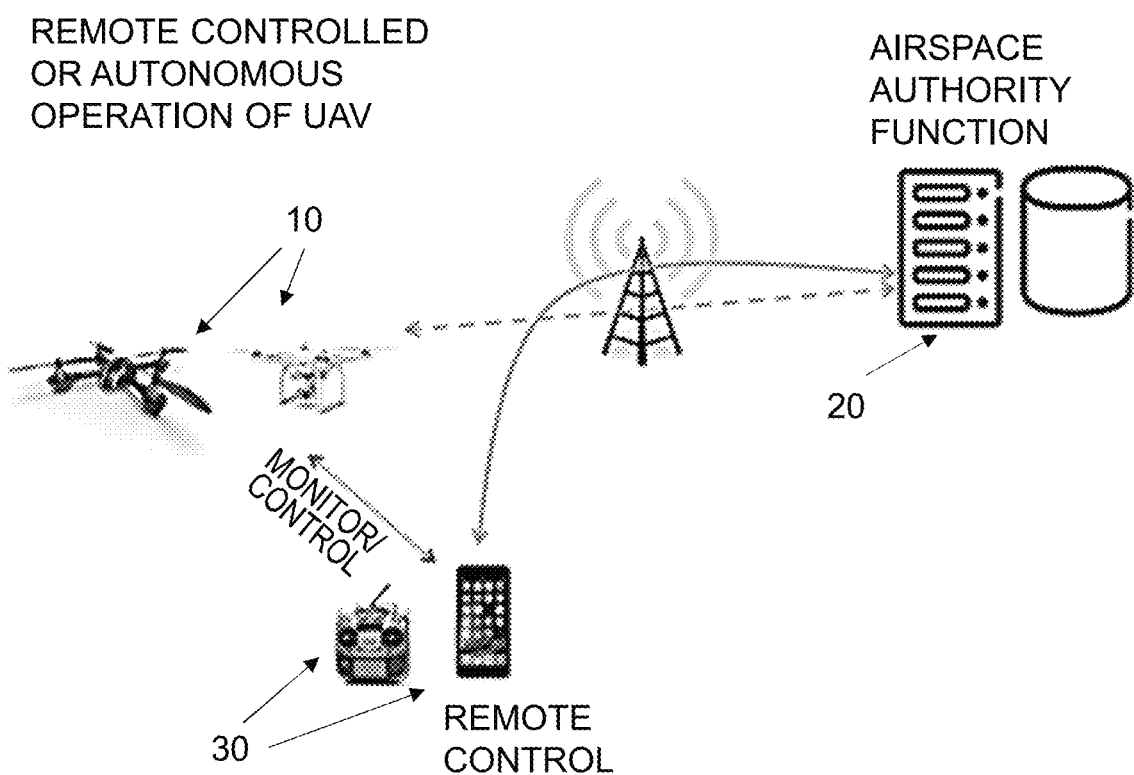
FIG. 1 is a schematic illustration of a system for managing flight of a UAV in controlled airspace according to an embodiment.
Figure 2:
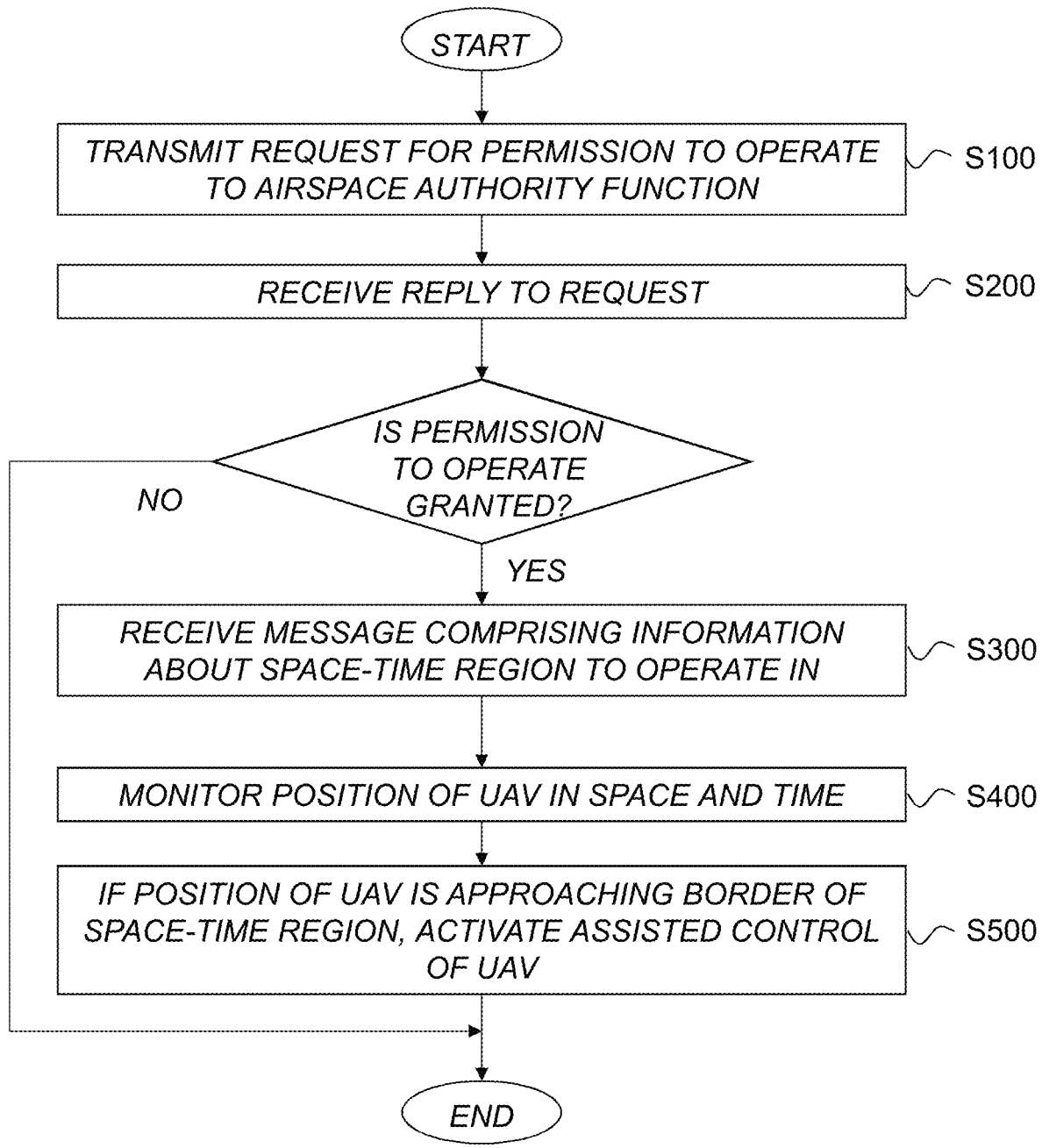
FIG. 2 is a schematic flow diagram illustrating an example of a method for executing an operating session for a UAV in controlled airspace according to an embodiment.

FIG. 2 is a schematic flow diagram illustrating an example of a method performed by a UAV, or a remote control 30 for the UAV for executing an operating session for the UAV in controlled airspace. The remote control is communicating with and controlling the UAV through control commands, see FIG. 1. The remote control 30 is a wireless device. It may be a specialized remote control with e.g. a display and physical controls like switches for high/low speed, camera control, forward and backward trimmer, hover up and down trimmer, sideward levers and trimmers. The remote control may for example also be a communication device such as a mobile phone with a client application, where the client application may be used for the remote control of the UAV, e.g. using a peer-to-peer Wireless Local Area Network (WLAN) connection, such as WiFi. The client application may e.g. be an Android or iOS type of mobile app, which may be connected not only to the UAV 10 and the ASA, but also to other servers running services associated with the UAV. The UAV 10 may, if equipped with cellular communication capabilities, have better cellular coverage than the remote control 30, since it usually is higher up than the remote control 30. In case the UAV has cellular capability, e.g. WiFi, cellular connectivity or a proprietary link may be used between the UAV and remote control, to relay connection to the ASA and other servers/services via the UAV. In other cases the UAV may be down in a basement searching for a bomb, and the operator is standing on the street with cellular coverage, while the UAV has none. In this case the signalling goes via the remote control. However, it may still be e.g. WiFi, cellular connectivity or a proprietary link to the UAV. A third example of a remote control, would for example be a wirelessly connected wearable like a smart-clock and wirelessly connected goggles or glasses with e.g. eye-tracking technology used for at least partly controlling the UAV.

The method of FIG. 2 comprises the step S100 of transmitting a request for permission to operate in the controlled airspace to an airspace authority function and the step S200 of receiving a reply to the request for permission to operate from the airspace authority function. If permission to operate is granted, the following steps are performed: step S300 of receiving a message comprising information about a space-time region of airspace to operate in from the airspace authority function, where the space-time region is defined as at least one portion of the controlled airspace varying with time, the step S400 of monitoring a position of the UAV in space and time, and, if the position of the UAV is within the space-time region and the UAV is either within a predetermined distance from a geographical border of the space-time region, or predicted to reach the geographical border of the space-time region within a predetermined time, and the step S500 of activating, directly or after a predetermined time, assisted control of the UAV to assist an operator of the UAV in keeping the UAV within the space-time region.

The assisted control may be implemented in various ways. In an embodiment a message is sent to the operator/pilot of the UAV notifying the operator that the UAV is approaching a border of the space-time region. In an alternative embodiment the control commands from the remote control may be modified in order to keep the UAV within the space-time region. In yet another embodiment the UAV may be maneuvered independently of control commands from the remote control, for example by allowing an autopilot function to take over the control of the UAV and e.g. force it to hover or land at a predefined place taking the surroundings, like trees and high buildings into account.

The communication between the ASA and the UAV should be protected from manipulation, and both the ASA and the UAV should be able to verify that the other party can be trusted. Thus, in an embodiment the method of FIG. 2 comprises communicating with the airspace authority function using security protocols involving authentication of the airspace authority function.

The UAV may in an embodiment communicate end-to-end secure state parameters to the ASA, possibly via the remote control in a particular embodiment. A secure acknowledgement from the ASA is required; otherwise assisted control of the UAV may be activated. Thus, in an embodiment the method of FIG. 2 comprises sending end-to-end secure state parameters to the airspace authority function and receiving an acknowledgement from the airspace authority function as a response. The acknowledgement may in one embodiment comprise information about the space-time region of airspace that the UAV should operate in. In a particular embodiment sending end-to-end secure state parameters to the airspace authority function may be performed on recurring occasions during the operating session of the UAV. In such an embodiment assisted control of the UAV may be activated if an acknowledgement from the airspace authority function fails be received on one of the recurring occasions.

Another possible event when assisted control of the UAV should be activated is if communication is lost between the UAV and the remote control. Thus, in an embodiment of the method of FIG. 2 the step S500 of activating assisted control of the UAV is performed if communication between the UAV 10 and the remote control for the UAV fails.

The message comprising information about a space-time region for the UAV to operate in may in one embodiment be implemented as a protected ticket (see further details below). Thus, in one embodiment of the method of FIG. 2 the step S300 of receiving the message comprising information about a space-time region of airspace to operate in comprises receiving a protected ticket for the space-time region, wherein the ticket is protected from tampering and/or encrypted.

Figure 3:
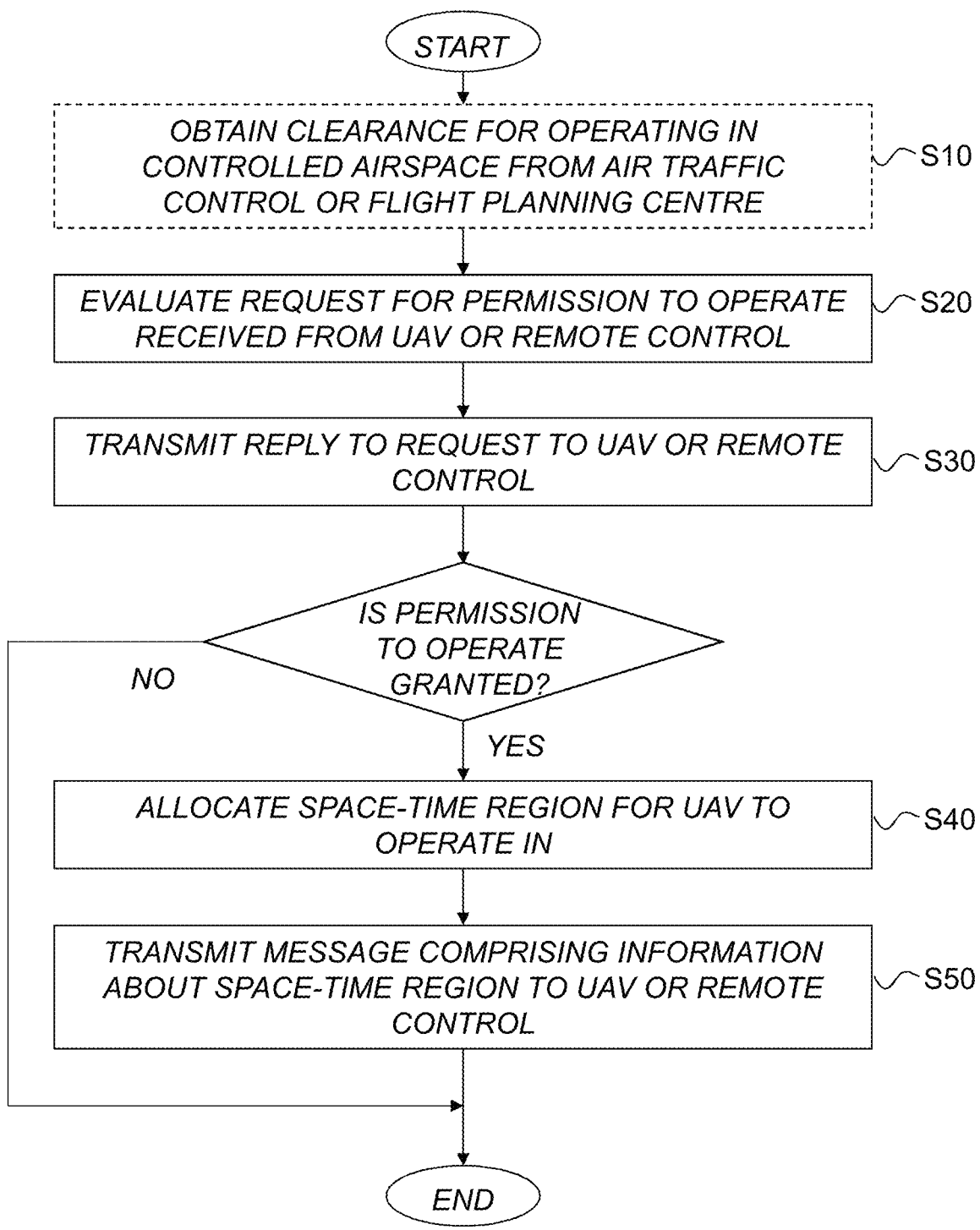
FIG. 3 is a schematic flow diagram illustrating an example of a method for enabling execution of an operating session for a UAV in controlled airspace according to an embodiment.

FIG. 3 is a schematic flow diagram illustrating an example of a method for enabling execution of an operating session for a UAV in controlled airspace. The method comprises the step S20 of evaluating a request for permission to operate in the controlled airspace upon receiving such a request from a UAV or a remote control for the UAV, and the step S30 of transmitting a reply to the request for permission to operate to the UAV or the remote control for the UAV. If permission to operate is granted, the following steps are performed: the step S40 of allocating a space-time region of airspace for the UAV to operate in, where the space-time region is defined as at least one portion of the controlled airspace varying with time, and the step S50 of transmitting a message comprising information about the space-time region to the UAV or the remote control for the UAV.

The ASA may in one embodiment request airspace from ATC, for example using state-of-the-art mechanisms as described above. Thus, in one embodiment the method of FIG. 3 further comprises the step S10 of obtaining a clearance for operating in the controlled airspace from an ATC.

Verifying that the UAV is a legitimate compliant device, for example that it is not hacked, may e.g. be performed through some verification mechanism such as remote attestation or sealed storage. Thus, in the method of FIG. 3 the step S20 of evaluating the request for permission to operate comprises verifying whether the UAV is a legitimate compliant device, using a trusted computing technique such as remote attestation or sealed storage.

As mentioned above, the communication between the ASA and the UAV should be protected from manipulation, and both the ASA and the UAV should be able to verify that the other party can be trusted. Furthermore, it may be of interest also to verify that the operator/pilot of the UAV can be trusted. For example, in the future it may be required to have some kind of license for operating a UAV, and it should then be possible to verify that the pilot of a UAV requesting permission to fly actually has this license. Even without the demand for a license it may be of value to be able to identify the operator, e.g. for insurance purposes and/or other safety purposes. The identity of a pilot may be verified e.g. by entering biometric data, using an electronic ID (such as the Swedish BankID), exchanging a trusted certificate or using some other verification technique, for example via the pilot's smart mobile phone. Thus, in an embodiment the method of FIG. 3 comprises communicating with the UAV or the remote control for the UAV using security protocols involving authentication of the UAV and/or an operator of the UAV.

As mentioned above, the UAV may in an embodiment communicate end-to-end secure state parameters to the ASA, which should then be acknowledged by the ASA. Thus, in an embodiment the method of FIG. 3 comprises sending an acknowledgement to the UAV or the remote control for the UAV as a response to receiving end-to-end secure state parameters from the UAV or the remote control for the UAV. The acknowledgement may in one embodiment comprise information about the space-time region of airspace that the UAV should operate in.

The allocated space-time region of airspace should be suitable for a particular UAV considering its flight performance such as battery time, speed etc. The issued space-time region may also consider the geographical situation within the airspace, such as buildings, trees, lakes, larger and smaller landmarks etc. Also the current and predicted weather situation may be considered. Thus, in an embodiment of the method of FIG. 3 the step S40 of allocating a space-time region of airspace for the UAV to operate in is based on operating performance parameters for the UAV. In another embodiment of the method of FIG. 3 the step S40 of allocating a space-time region of airspace for the UAV to operate in is based on at least one of geographical conditions and weather conditions within the controlled airspace.

Also the priority of different aircraft can be taken into consideration when allocating a space-time region for a particular UAV. For example, a UAV carrying a heart starter may be prioritized over other aircraft. Thus, in an embodiment of the method of FIG. 3 the step S40 of allocating a space-time region of airspace for the UAV to operate in is based on a priority of the UAV as compared to other traffic within the controlled airspace.

As mentioned above, the message comprising information about a space-time region for the UAV to operate in may in one embodiment be implemented as a protected ticket. Thus, in one embodiment of the method of FIG. 3 the step S40 of allocating a space-time region of airspace for the UAV to operate in comprises issuing a protected ticket for the space-time region, and the step S50 of transmitting a message comprising information about the space-time region comprises transmitting the protected ticket, wherein the ticket is protected from tampering and/or encrypted.

In an embodiment a portion of the space-time region is reserved for exceptional cases requiring the UAV to take an exceptional route, for example if the batteries run low, or the connection between the UAV and remote control is lost, or the UAV simply has to land somewhere etc.

As described above, the proposed solution concerns a method for an air space authority function to manage a part of controlled airspace. Thus, in an embodiment the method of FIG. 3 is performed by an airspace authority function.

In the following, some non-limiting example embodiments are described.

The proposed solution concerns a method and system, see FIG. 1, for an Air Space Authority (ASA) to manage a part of controlled airspace by requesting airspace and allocating space-time slices of the airspace to UAVs and pilots. In one embodiment, the ASA manages the airspace on behalf of ATC. In a particular embodiment, the ASA functionality could in practice become implemented in a server hosted e.g. by the ATC, but we have made a distinction between the two in this description.

In an embodiment, ASA may request airspace from ATC, for example using state-of-the-art mechanisms in one embodiment, e.g. flight plan/clearance mechanism or the prior art notice mechanism described above, or in another embodiment is exclusively given right to a space region (e.g. below 500 ft in a city as suggested by Google).

Figure 4:
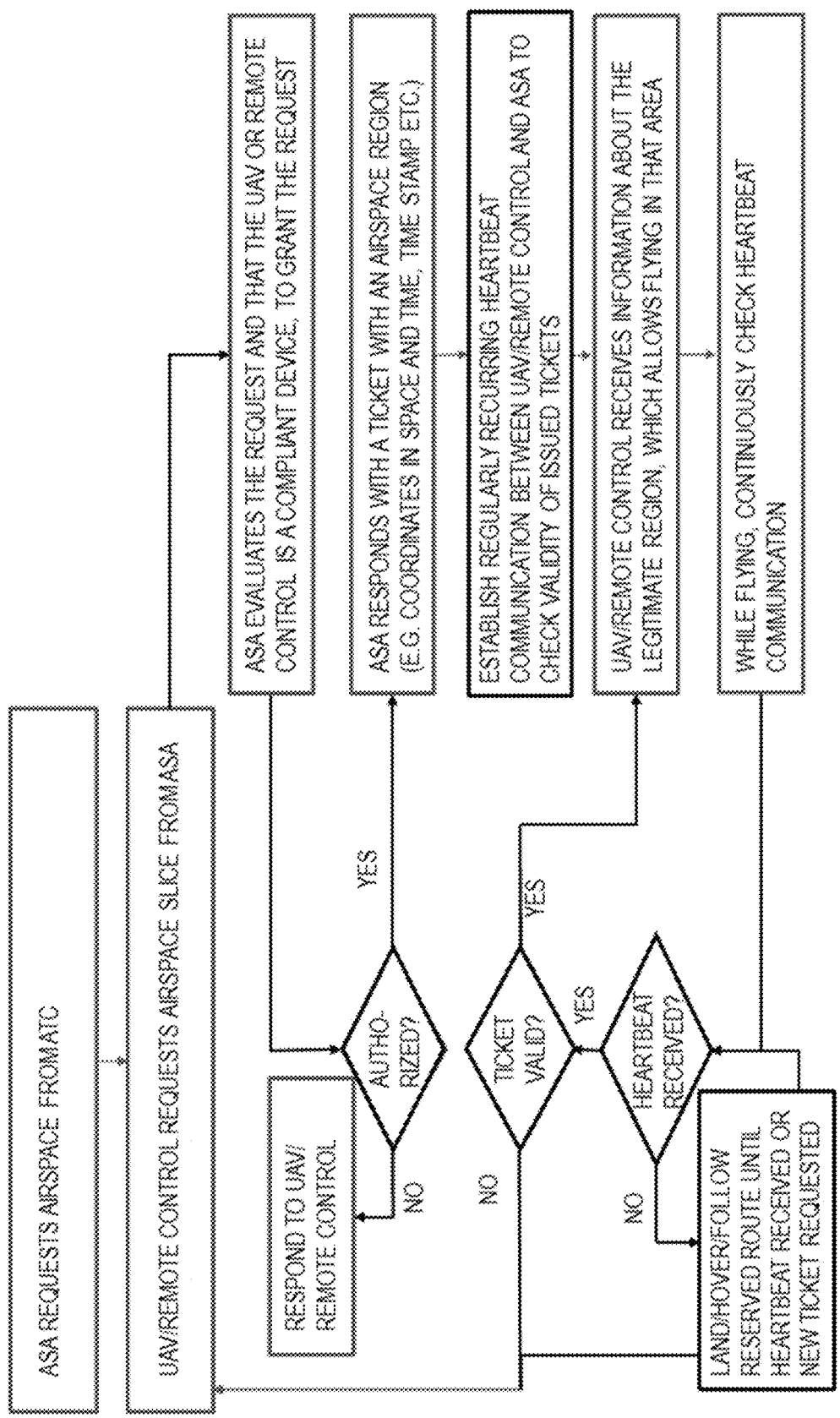
FIG. 4 is a schematic flow diagram illustrating a particular example of a method for managing flight of a UAV in controlled airspace.

FIG. 4 is a schematic flow diagram illustrating a particular example of a method for managing flight of a UAV in controlled airspace. UAVs/remote controls request ASA for permission to fly. The request may be an itinerary or just a request to fly. The ASA communicates with the UAV, using some protocol (e.g. Hypertext Transfer Protocol (HTTP), Constrained Application Protocol (CoAP)) over some wireless communication technology (e.g. cellular, Wireless Local Area Network (WLAN)) and reads the state of the device and other parameters and that the UAV is a legitimate compliant device that is not hacked. The latter can be performed through some verification mechanism such as remote attestation [https://en.wikipedia.org/wiki/Trusted-_Computing] of the embedded computing device of the UAV, whereby the state of the UAV can be securely measured. The communication between ASA and UAV can go directly or via the remote control and is protected from manipulation, using state of the art security protocols, authenticated with trusted key material securely stored in the UAV—which the user/pilot is not allowed to change.

The ASA issues a protected ticket for a space-time slice of the airspace it manages—a portion of air changing with time—suitable for this device considering its speed, battery and other parameters obtained in the previous step. The issued space-time slice considers the geographical situation, such as buildings, large trees, and larger and smaller landmarks. The ticket may be passed via the remote control to the UAV. For implementing the request for, and provisioning of ticket, the OAuth framework [https://tools.ietf.org/html/ rfc6749] can be used, in particular as described in Authentication and Authorization for Constrained Environments (ACE) [https://tools.ietf.org/html/draft-ietf-ace-oauth-authz]. Examples of tickets are the OAuth or ACE access tokens (JWT [https://tools.ietf.org/html/rfc7519], CWT [https://tools.ietf.org/html/draft-ietf-ace-cbor-web-token]).

The ticket is verified and processed in a trusted execution environment (TEE) on the UAV (e.g. ARM TrustZone [http://www.arm.com/products/security-on-arm/trustzone, retrieved on 6 Oct. 2016] or GlobalPlatforms TEE (http://www.globalplatform.org/mediaguidetee.asp, retrieved on 6 Oct. 2016) and the position in space-time of the UAV is continuously monitored. If the UAV is reaching the border of the space-time specified in the ticket, an autopilot application within the UAV takes over and keeps the UAV within the allocated slice, independent of what other instruction or remote control command it receives from the pilot. This is enforced e.g. using trusted computing techniques in the UAV. As a consequence the UAV should never leave its slice, which provides an efficient method for controlling the airspace.

A portion of the slice is reserved for exceptional cases if the batteries runs low or the UAV simply has to land somewhere. Exceptional routes can be made disjoint between different UAV in the same way as other parts of the slice.

The ticket may also be used on the remote control by drawing geographical information representing the current allowed area of the slice and the position of the UAV, supporting the pilot to fly in the allowed area and notifying the pilot when a border is approaching.

The UAV communicates end-to-end secure state parameters on specific occasions to ASA ("heartbeats"), potentially via the remote control. A secure acknowledgement from the ASA is required otherwise the UAV autonomously takes an exceptional route, described in the initial ticket, typically hovering or taking down the UAV in a safe way. A heartbeat may e.g. be implemented with a simple HTTP or CoAP request/response, protected with e.g. Internet Layer security (such as IPSec), transport layer security (such as HTTP over Secure Socket Layer or HTTP over Transport Layer Security) or application layer security (such as Secure Shell).

The ASA may revoke tickets through the acknowledgement message and withdraw or replace the issued ticket so that a given slice is not allowed anymore. In this way a prioritized UAV or other plane may be take over a previously reserved a slice, e.g. when a heart starter needs to be urgently delivered across the city or in other emergency situations. The same mechanism may be applied to temporarily prevent commercial flight traffic which in such cases have lower priority. Priority may be stated in the ticket, or is some other assertion, enabling UAVs to prove to each other and to authorities which priority they have. Alternatively priority may just be known to the ASA/ATA and used as an instrument for re-directing traffic.

As mentioned above, the proposed solution is a method and system for an Airspace Authority to manage a part of controlled airspace e.g. on behalf of ATC by allocating airspace-time slices to UAVs and pilots. In one embodiment, the ASA requests airspace from ATC on a regular basis, independent of if an UAV has requested a slice or not. See FIG. 4. This is slightly different compared to the legacy submit flight plan/clearance procedure, in that airspace rather than a flight plan is requested. Airspace does not necessarily have a start point and a destination.

In an alternative embodiment, the ASA first receives a request for a slice from an UAV, and then the ASA makes a request for airspace. This maps well to the legacy "prior notice" procedure with ATC.

Slices and Trajectories

Figure 5:
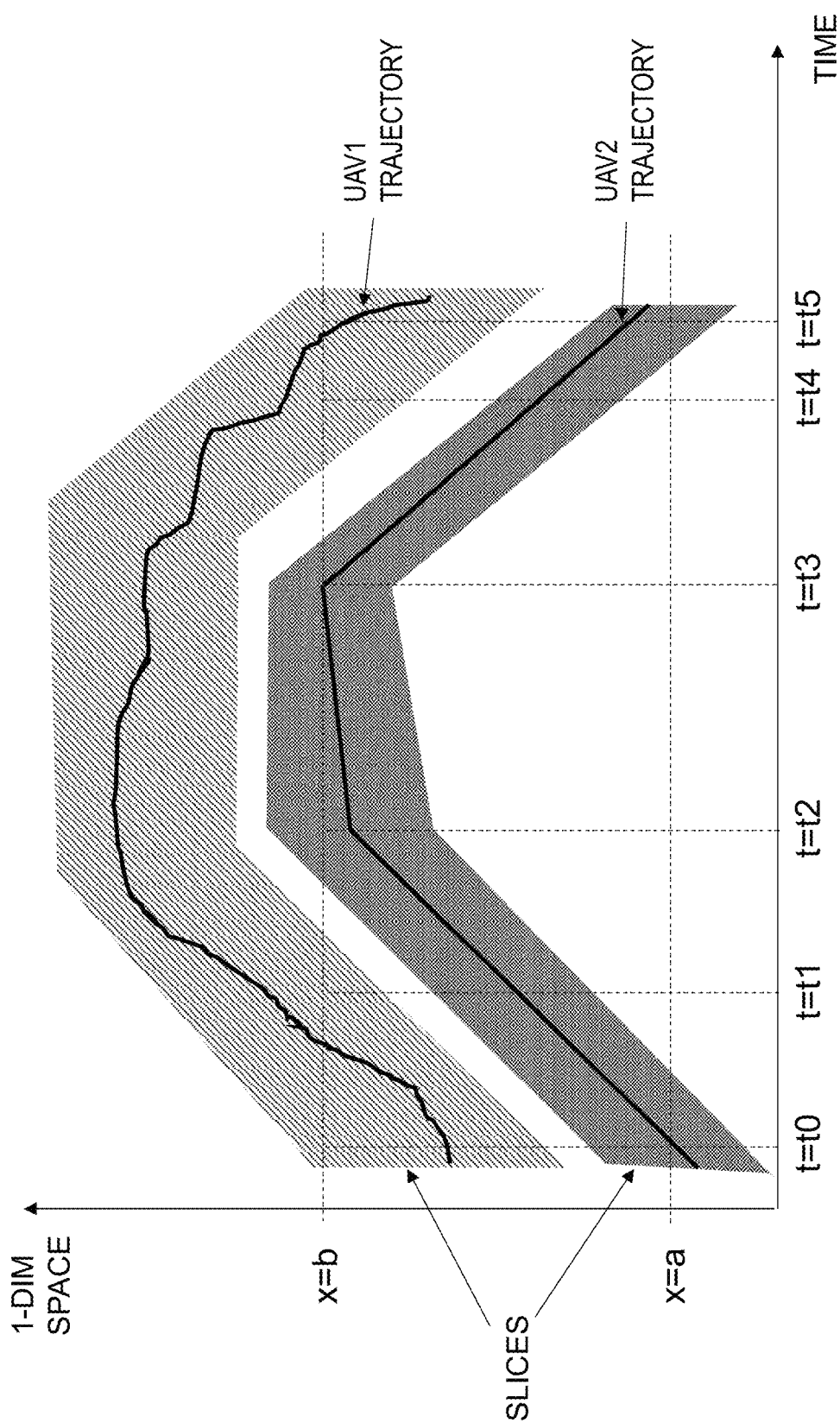
FIG. 5 is a schematic illustration of an example of space-time slices and UAV trajectories in 1-dimensional space.

The slicing of space-time allows for an efficient use of managing a large number of UAVs. FIG. 5 gives a simple example of how a region of space can be securely shared between different UAVs. For simplicity, space is considered 1-dimensional instead of 3-dimensional. The region between $x=a$ and $x=b$ is time-shared between a first UAV (UAV1) and a second UAV (UAV2) according to the slices they have been allocated. The slices in FIG. 5 can be expressed with linear equations in x and t, which are easy to analyze and compare with UAV position.

FIG. 5 shows the trajectories of UAV1 and UAV2. UAV1 flies from a to b, standing still at b for some time and then flying back to a. UAV2 is also passing b, but before and after UAV1 is in b. Since the space-time slices are well separated, and there is no risk for collision between the UAVs as long as they remain within their allocated slices.

Figure 6:
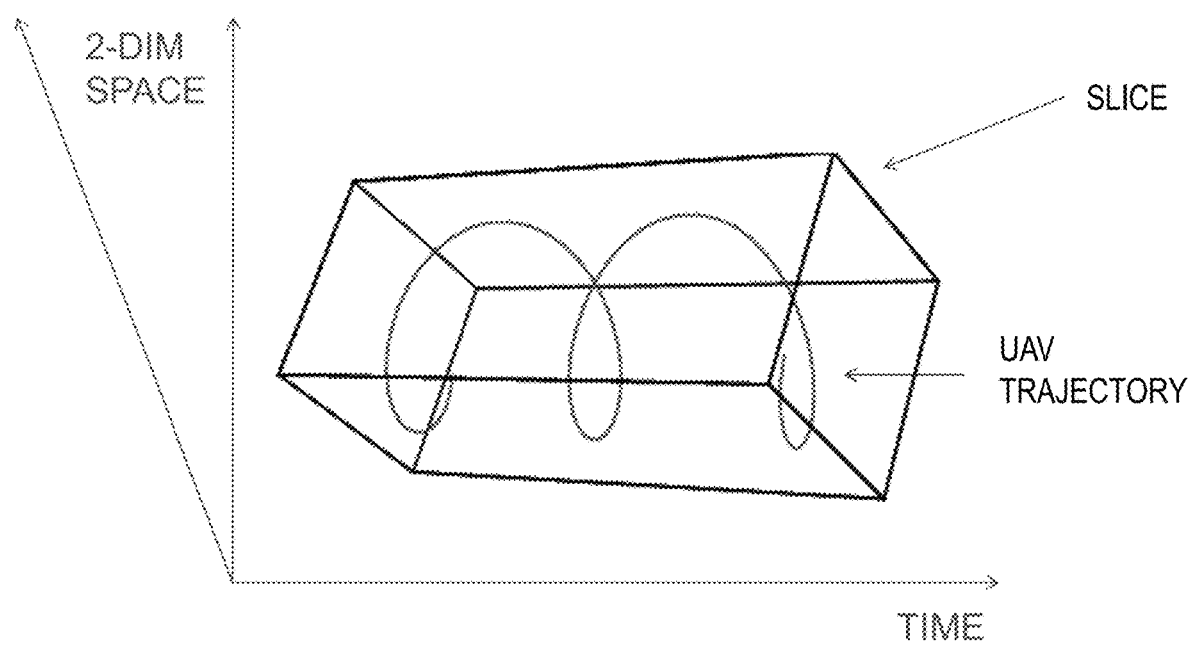
FIG. 6 is a schematic illustration of an example of a space-time slice and a UAV trajectory in 2-dimensional space.

FIG. 6 illustrates an example of UAV slice and trajectory with 2-dimensional space. Again this slice can be expressed in linear equations making verification simple. The same applies to 3-dimensional space.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, all or at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided an apparatus in an unmanned aerial vehicle, UAV, or a remote control for the UAV, configured to execute an operating session for the UAV in controlled airspace, where the apparatus is configured to transmit a request for permission to operate in the controlled airspace to an airspace authority function, and to receive a reply to the request for permission to operate from the airspace authority function. The apparatus is further configured to do the following if permission to operate is granted: receive a message comprising information about a space-time region of airspace to operate in from the airspace authority function, where the space-time region is defined as at least one portion of the controlled airspace varying with time, to monitor a position of the UAV in space and time, and to activate, directly or after a predetermined time, assisted control of the UAV to assist an operator of the UAV in keeping the UAV within the space-time region if the position of the UAV is within the space-time region and the UAV is either within a predetermined distance from a geographical border of the space-time region, or predicted to reach the geographical border of the space-time region within a predetermined time.

As mentioned above, the assisted control may be implemented in various ways. In an embodiment, the apparatus may be configured to send a message to the operator of the UAV notifying the operator that the UAV is approaching a geographical border of the space-time region. In another embodiment the apparatus may be configured to modify control commands from the remote control for the UAV in order to keep the UAV within the space-time region. In yet another embodiment the apparatus may be configured to maneuver the UAV independent of control commands from the remote control for the UAV in order to keep the UAV within the space-time region.

The communication between the ASA and the UAV should be protected from manipulation, and both the ASA and the UAV should be able to verify that the other party can be trusted. Thus, in an embodiment the apparatus is configured to communicate with the airspace authority function using security protocols involving authentication of the airspace authority function.

In an embodiment the apparatus is configured to send end-to-end secure state parameters to the airspace authority function and receive an acknowledgement from the airspace authority function as a response. The apparatus is in one embodiment configured to receive an acknowledgement from the airspace authority function comprising information about a space-time region of airspace to operate in. In a particular embodiment the apparatus is configured to send end-to-end secure state parameters to the airspace authority function on recurring occasions during the operating session of the UAV. In such an embodiment the apparatus is configured to activate assisted control of the UAV if an acknowledgement from the airspace authority function fails be received on one of the recurring occasions.

Another possible event when assisted control of the UAV should be activated is if communication is lost between the UAV and the remote control. Thus, in an embodiment the apparatus is configured to activate assisted control of the UAV if communication between the UAV and the remote control for the UAV fails.

As mentioned above, the message comprising information about a space-time region for the UAV to operate in may in one embodiment be implemented as a protected ticket. Thus, in one embodiment the apparatus is configured to receive the message comprising information about a space-time region of airspace to operate in by receiving a protected ticket for the space-time region, wherein the ticket is protected from tampering and/or encrypted.

According to a particular aspect of the proposed technology, there is provided an unmanned aerial vehicle comprising an apparatus according to the above.

Figure 7:
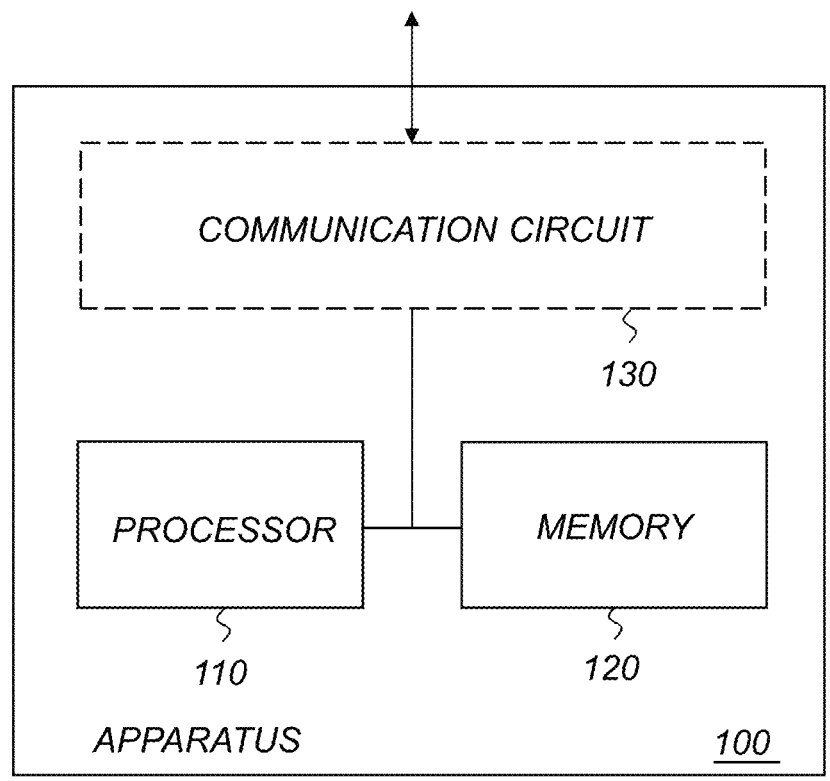
FIG. 7 is a schematic block diagram illustrating an example of an apparatus configured to execute an operating session for a UAV in controlled airspace according to an embodiment.

FIG. 7 is a schematic block diagram illustrating an example of an apparatus 100, based on a processor-memory implementation according to an embodiment. In this particular example, the apparatus 100 comprises at least one processor 110 and a memory 120, the memory 120 comprising instructions, which when executed by the at least one processor 110 cause the at least one processor 110 to execute an operating session for a UAV in controlled airspace.

According to another aspect of the proposed technology there is provided an apparatus configured to enable execution of an operating session for an unmanned aerial vehicle, UAV, in controlled airspace, where the apparatus is configured to evaluate a request for permission to operate in the controlled airspace upon receiving such a request from a UAV or a remote control for the UAV, and to transmit a reply to the request for permission to operate to the UAV or the remote control for the UAV. The apparatus is further configured to do the following if permission to operate is granted: allocate a space-time region of airspace for the UAV to operate in, where the space-time region is defined as at least one portion of the controlled airspace varying with time, and to transmit a message comprising information about the space-time region to the UAV or the remote control for the UAV.

In a particular embodiment the apparatus is further configured to obtain a clearance for operating in the controlled airspace from an ATC.

In an embodiment the apparatus is configured to evaluate the request for permission to operate by verifying whether the UAV is a legitimate compliant device, using a trusted computing technique such as remote attestation or sealed storage.

In an embodiment the apparatus is configured to communicate with the UAV or the remote control for the UAV using security protocols involving authentication of the UAV and/or an operator of the UAV. In such an embodiment the apparatus may in one embodiment be configured to send an acknowledgement to the UAV or the remote control for the UAV as a response to receiving end-to-end secure state parameters from the UAV or the remote control for the UAV. In a particular embodiment the acknowledgement comprises information about a space-time region of airspace for the UAV to operate in.

In an embodiment the apparatus is configured to allocate a space-time region of airspace for the UAV to operate in based on geographical conditions and/or weather conditions within the controlled airspace. In another embodiment the apparatus is configured to allocate a space-time region of airspace for the UAV to operate in based on operating performance parameters for the UAV, such as e.g. speed, battery time etc.

In an embodiment the apparatus is configured to allocate a space-time region of airspace for the UAV to operate in based on a priority of the UAV as compared to other traffic within the controlled airspace.

In an embodiment the apparatus is configured to allocate space-time region of airspace for the UAV to operate in by issuing a protected ticket for the space-time region, and to transmit a message comprising information about the space-time region by transmitting the protected ticket, where the ticket is protected from tampering and/or encrypted.

In an embodiment a portion of the space-time region is reserved for exceptional cases requiring the UAV to take an exceptional route, for example if the batteries run low, or the connection between the UAV and remote control is lost, or the UAV simply has to land somewhere etc.

In one embodiment the apparatus is included in an airspace authority function.

Figure 8:
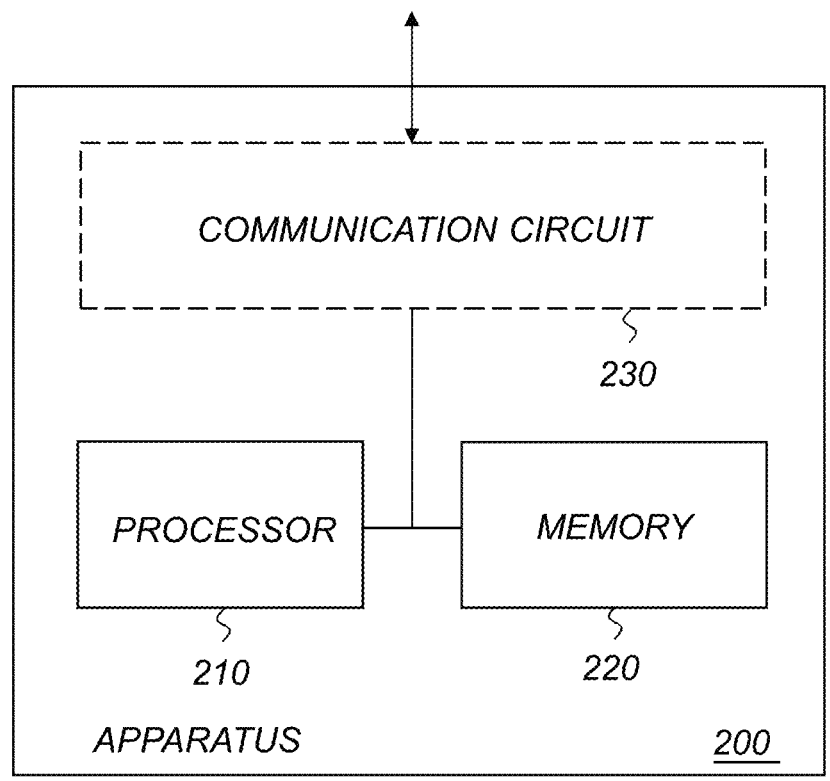
FIG. 8 is a schematic block diagram illustrating an example of an apparatus configured to enable execution of an operating session for a UAV in controlled airspace according to an embodiment.

FIG. 8 is a schematic block diagram illustrating an example of an apparatus 200, based on a processor-memory implementation according to an embodiment. In this particular example, the apparatus 200 comprises at least one processor 210 and a memory 220, the memory 220 comprising instructions, which when executed by the at least one processor 210 cause the at least one processor 210 to enable execution of an operating session for a UAV in controlled airspace.

Figure 9:
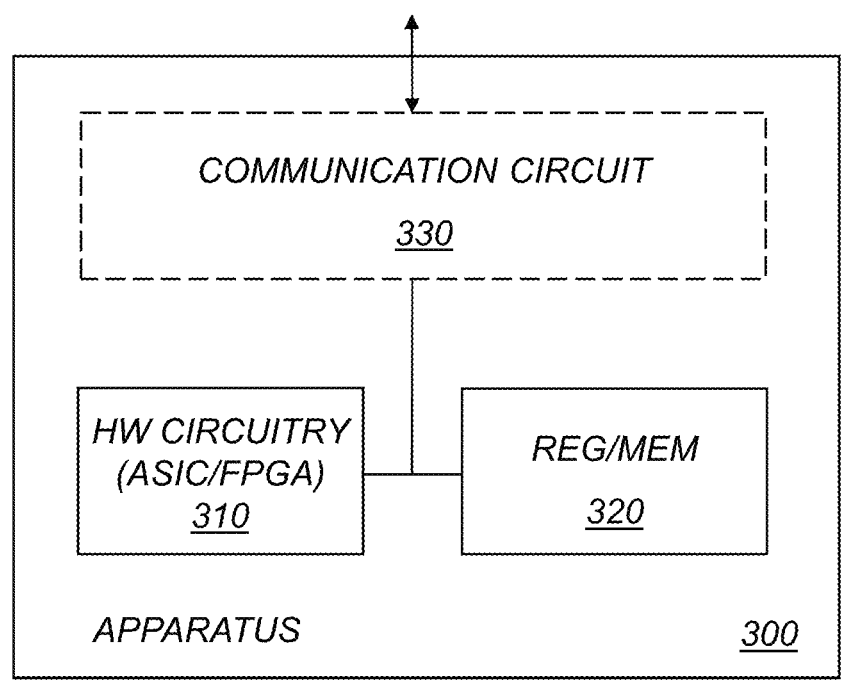
FIG. 9 is a schematic block diagram illustrating another example of an apparatus configured to execute/enable execution of an operating session for a UAV in controlled airspace according to an embodiment.

FIG. 9 is a schematic block diagram illustrating another example of an apparatus 300, based on a hardware circuitry implementation according to an embodiment. Particular examples of suitable hardware circuitry 310 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 320.

Optionally, the apparatus 300 may also include a communication circuit 330. The communication circuit 330 may include functions for wired and/or wireless communication with other devices and/or network nodes in the network. In a particular example, the communication circuit 330 may be based on radio circuitry for communication with one or more other nodes, including transmitting and/or receiving information. The communication circuit 330 may be interconnected to a processor 110; 210 and/or memory 120; 220. The communication circuit 330 may be interconnected to the hardware circuitry 310 and/or REG/MEM 320. By way of example, the communication circuit 330 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 10:
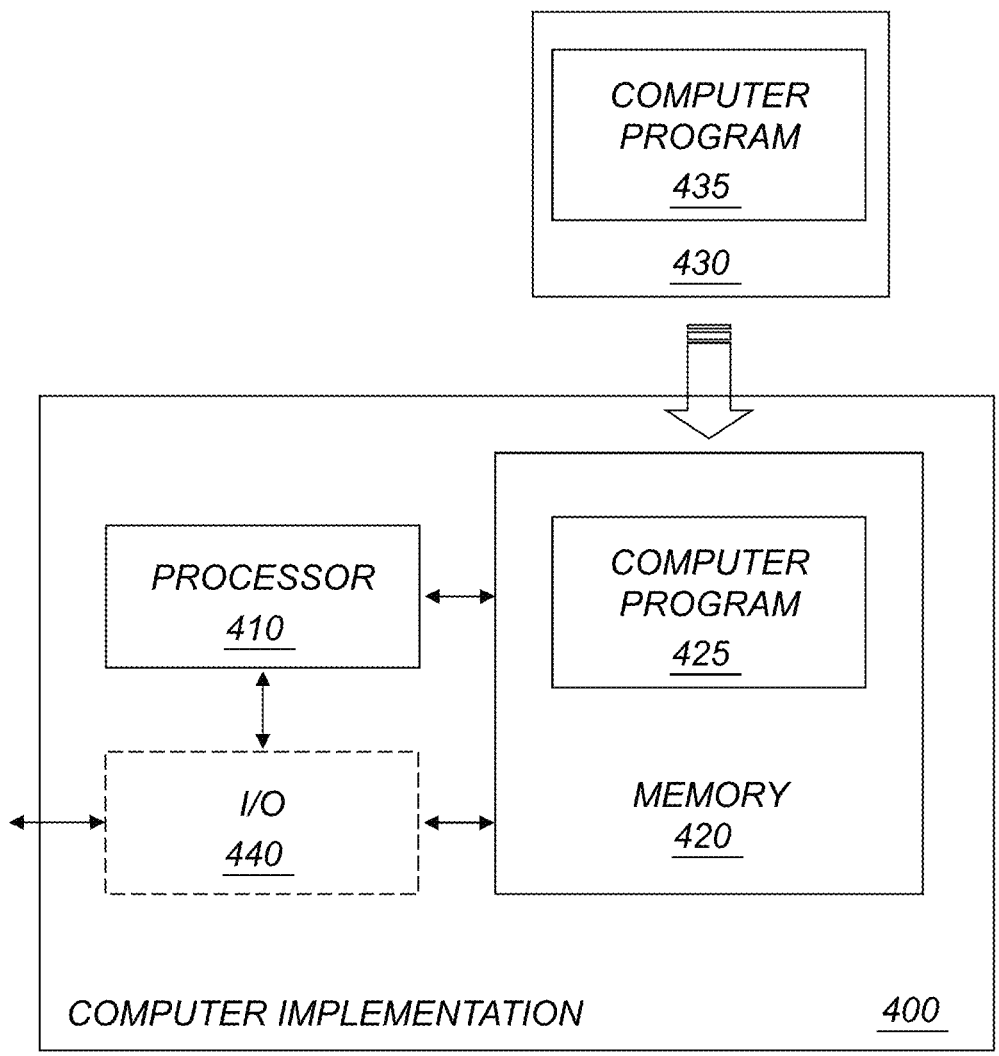
FIG. 10 is a schematic diagram illustrating an example of a computer-implementation according to an embodiment.

FIG. 10 is a schematic diagram illustrating an example of a computer-implementation 400 according to an embodiment. In this particular example, at least some of the steps, functions, procedures, modules and/or blocks described herein are implemented in a computer program 425; 435, which is loaded into a computer readable storage medium 420 in the form of a memory for execution by processing circuitry including one or more processors 410. The processor(s) 410 and memory are interconnected to each other to enable normal software execution. An optional input/output device 440 may also be interconnected to the processor(s) 410 and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, a computer program 425; 435 for executing an operating session for an unmanned aerial vehicle, UAV, in controlled airspace comprises instructions, which when executed by at least one processor 410, cause the processor(s) 410 to prepare a request for permission to operate in the controlled airspace for transmission to an airspace authority function, process a reply to the request for permission to operate received from the airspace authority function, and, if permission to operate is granted, do the following: process a message comprising information about a space-time region of airspace to operate in received from the airspace authority function, where the space-time region is defined as at least one portion of the controlled airspace varying with time, monitor a position of the UAV in space and time, and activate, directly or after a predetermined time, assisted control of the UAV to assist an operator of the UAV in keeping the UAV within the space-time region if the position of the UAV is within the space-time region and the UAV is either within a predetermined distance from a geographical border of the space-time region, or predicted to reach the geographical border of the space-time region within a predetermined time.

In another embodiment, a computer program 425; 435 for enabling execution of an operating session for an unmanned aerial vehicle, UAV, in controlled airspace comprises instructions, which when executed by at least one processor 410, cause the processor(s) 410 to evaluate a request for permission to operate in the controlled airspace upon receiving such a request from a UAV or a remote control for the UAV, prepare a reply to the request for permission to operate for transmission to the UAV or the remote control for the UAV, and, if permission to operate is granted, do the following: allocate a space-time region of airspace for the UAV to operate in, where the space-time region is defined as at least one portion of the controlled airspace varying with time, and prepare a message comprising information about the space-time region for transmission to the UAV or the remote control for the UAV.

In an particular embodiment, the computer program 425; 435 for enabling execution of an operating session for an unmanned aerial vehicle, UAV, in controlled airspace comprises instructions, which when executed by the processor 410 causes the processor 410 to obtain a clearance for operating in the controlled airspace from an ATC.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on the computer-readable storage medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 11:
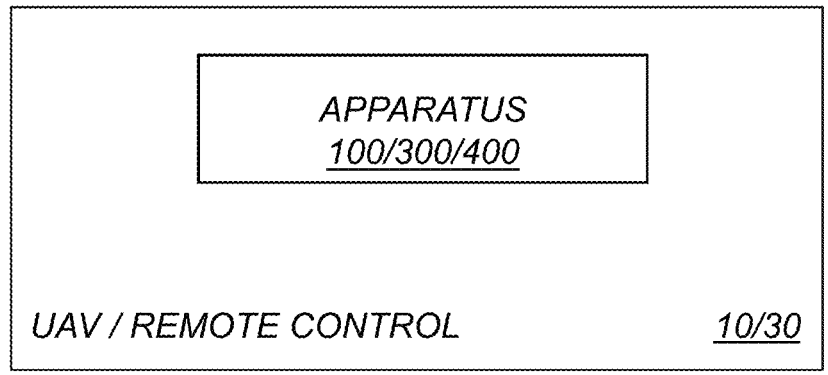
FIG. 11 is a schematic block diagram illustrating an example of a UAV/remote control comprising an apparatus configured to execute an operating session for a UAV in controlled airspace according to any of the embodiments.

FIG. 11 is a schematic block diagram illustrating an example of a UAV 10/remote control 30 comprising an apparatus 100; 300; 400 according to any of the embodiments.

Figure 12:
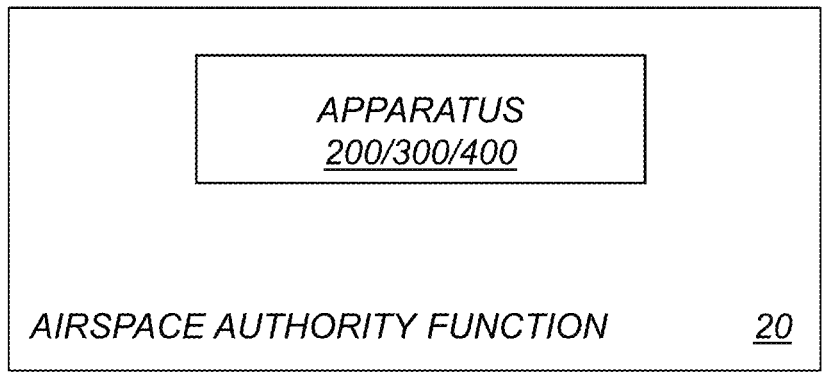
FIG. 12 is a schematic block diagram illustrating an example of an airspace authority function comprising an apparatus configured to enable execution of an operating session for a UAV in controlled airspace according to any of the embodiments.

FIG. 12 is a schematic block diagram illustrating an example of an airspace authority function 20 comprising an apparatus 100; 200; 300; 400 according to any of the embodiments.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 13:
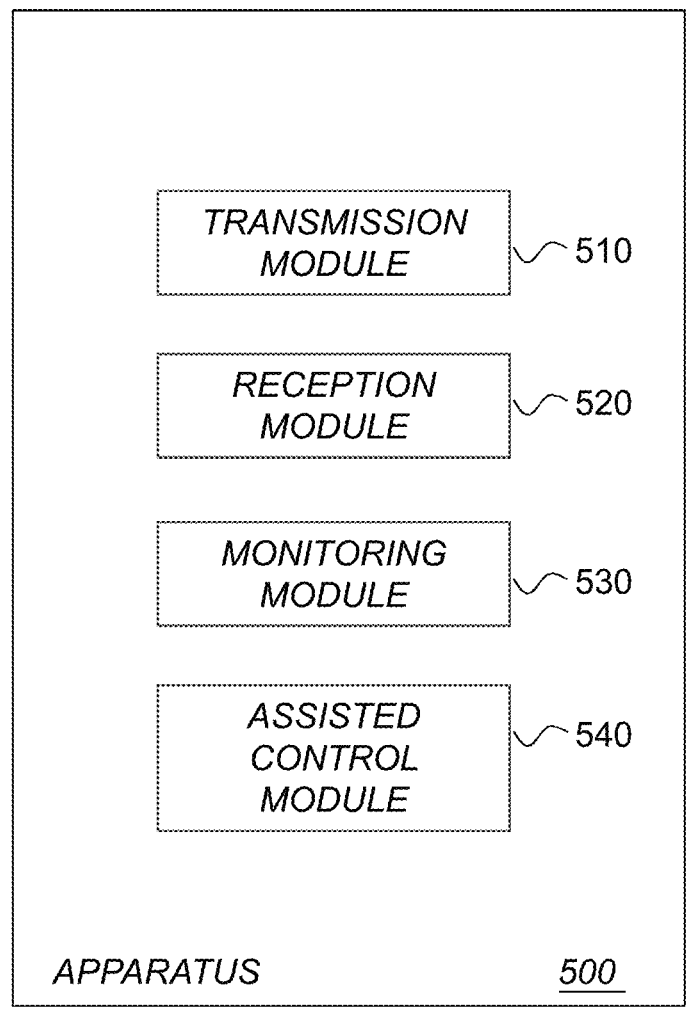
FIG. 13 is a schematic diagram illustrating an example of an apparatus for executing an operating session for a UAV in controlled airspace according to an embodiment.

FIG. 13 is a schematic diagram illustrating an example of an apparatus 500 in a UAV, or a remote control for the UAV, for executing an operating session for the UAV in controlled airspace. The apparatus 500 comprises a transmission module 510 for transmitting a request for permission to operate in the controlled airspace to an airspace authority function, a reception module 520 for receiving, from the airspace authority function, a reply to the request for permission to operate, and, if permission to operate is granted, a message comprising information about a space-time region of airspace to operate in, where the space-time region is defined as at least one portion of the controlled airspace varying with time. The apparatus 500 further comprises a monitoring module 530 for monitoring, if permission to operate is granted, a position of the UAV in space and time, and an assisted control module 540 for assisting, if permission to operate is granted, an operator of the UAV in keeping the UAV within the space-time region, where the assisted control module 540 is activated, directly or after a predetermined time, if the position of the UAV is within the space-time region and if the UAV is either within a predetermined distance from a geographical border of the space-time region, or predicted to reach the geographical border of the space-time region within a predetermined time.

Figure 14:
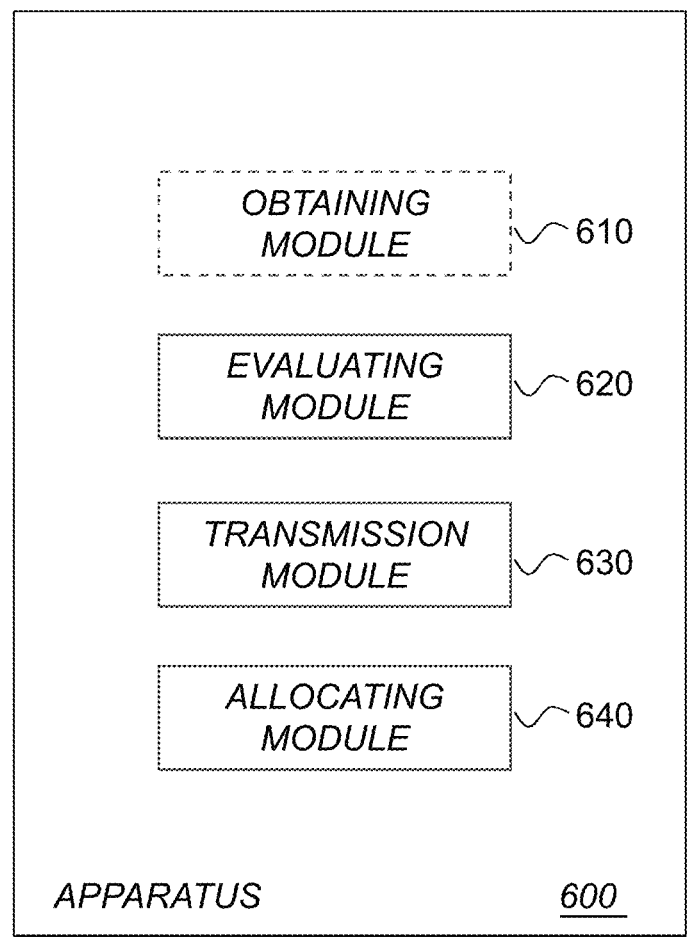
FIG. 14 is a schematic diagram illustrating an example of an apparatus for enabling execution of an operating session for a UAV in controlled airspace according to an embodiment.

FIG. 14 is a schematic diagram illustrating an example of an apparatus 600 for enabling execution of an operating session for a UAV in controlled airspace. The apparatus 600 comprises an evaluating module 620 for evaluating a request for permission to operate in the controlled airspace upon receiving such a request from a UAV or a remote control for the UAV, a transmission module 630 for transmitting, to the UAV or the remote control for the UAV, a reply to the request for permission to operate and, if permission to operate is granted, a message comprising information about a space-time region of airspace for the UAV to operate in, where the space-time region is defined as at least one portion of the controlled airspace varying with time. The apparatus 600 also comprises an allocating module 640 for allocating, if permission to operate is granted, the space-time region of airspace for the UAV to operate in.

In a particular embodiment the apparatus 600 further comprises an obtaining module 610 for obtaining a clearance for operating in the controlled airspace from an ATC.

Alternatively it is possible to realize the module(s) in FIGS. 13 and 14 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Although the present embodiments have been described mainly in the context of unmanned aerial vehicles flying in controlled airspace, the proposed technology may possibly also be implemented for other scenarios and vehicles, both manned and unmanned, for example ground vehicles such as cars, trucks etc. or water surface vehicles such as boats, ships etc.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for executing an operating session for an unmanned aerial vehicle (UAV) in controlled airspace, the method comprising:
    transmitting a request for permission to operate in the controlled airspace to an airspace authority function;
    receiving a reply to the request for permission to operate from the airspace authority function;
    receiving a message comprising information about a space-time region of the controlled airspace to operate in from the airspace authority function, the space-time region being defined as at least one portion of the controlled airspace varying with time;
    monitoring a position of the UAV in space and time;
    predicting that the UAV will reach a boundary of the at least one portion of the controlled airspace within an amount of time;
    determining that the amount of time is less than a threshold; and
    as a result of determining that the amount of time is less than the threshold, activating assisted control of the UAV to assist an operator of the UAV in keeping the UAV within the space-time region.

2. A method for enabling execution of an operating session for an unmanned aerial vehicle (UAV) in controlled airspace, the method comprising:
    evaluating a request for permission to operate in the controlled airspace upon receiving the request for permission from the UAV or a remote control for the UAV;
    transmitting a reply to the request for permission;
    allocating a space-time region of the controlled airspace for the UAV to operate in, the space-time region being defined as at least one portion of the controlled airspace varying with time; and
    transmitting a protected ticket comprising information about the space-time region to the UAV or the remote control for the UAV, wherein the protected ticket is based on at least one parameter of the UAV.

3. An apparatus configured to execute an operating session for an unmanned aerial vehicle (UAV) in a controlled airspace, wherein the apparatus is configured to:
    transmit a request for permission to operate in the controlled airspace to an airspace authority function;
    receive a reply to the request for permission to operate from the airspace authority function; and
    perform the following if the request for permission to operate is granted:
    receive a message comprising information about a space-time region of the controlled airspace to operate in from the airspace authority function, the space-time region being defined as at least one portion of the controlled airspace varying with time;
    monitor a position of the UAV in space and time;
    predict that the UAV will reach a boundary of the at least one portion of the controlled airspace within an amount of time;
    determine that the amount of time is less than a threshold; and as a result of determining that the amount of time is less than the threshold, activate assisted control of the UAV to assist an operator of the UAV in keeping the UAV within the space-time region.

4. The apparatus of claim 3, wherein the apparatus is further configured to do at least one of the following when assisted control of the UAV is activated:
send a message to the operator of the UAV notifying the operator that the UAV is approaching a geographical border of the space-time region;
modify control commands from a remote control for the UAV in order to keep the UAV within the space-time region; and
maneuver the UAV independent of the control commands from the remote control for the UAV in order to keep the UAV within the space-time region.

5. The apparatus of claim 3, wherein the apparatus is further configured to communicate with the airspace authority function using security protocols involving authentication of the airspace authority function.

6. The apparatus of claim 5, wherein the apparatus is further configured to send end-to-end secure state parameters to the airspace authority function and receive an acknowledgement from the airspace authority function as a response.

7. The apparatus of claim 6, wherein the apparatus is further configured to receive an acknowledgement from the airspace authority function comprising information about the space-time region of the controlled airspace to operate in.

8. The apparatus of claim 6, wherein the apparatus is further configured to send end-to-end secure state parameters to the airspace authority function on recurring occasions during the operating session of the UAV.

9. The apparatus of claim 3, wherein the apparatus is further configured to activate assisted control of the UAV if communication between the UAV and a remote control for the UAV fails.

10. The apparatus of claim 3, wherein the apparatus is further configured to receive the message comprising information about the space-time region of the controlled airspace to operate in by receiving a protected ticket for the space-time region, wherein the ticket is protected from tampering and/or encrypted.

11. The apparatus of claim 3, wherein the apparatus comprises at least one processor and a memory, the memory comprising instructions, which when executed by the at least one processor cause the at least one processor to execute an operating session for a UAV in controlled airspace.

12. An unmanned aerial vehicle comprising an apparatus of claim 3.

13. An apparatus configured to enable execution of an operating session for an unmanned aerial vehicle (UAV) in a controlled airspace, wherein the apparatus is configured to:
evaluate a request for permission to operate in the controlled airspace upon receiving the request for permission from a UAV or a remote control for the UAV;
transmit a reply to the request for permission to operate to the UAV or the remote control for the UAV; and
perform the following if the request for permission to operate is granted:
allocate a space-time region of the controlled airspace for the UAV to operate in, the space-time region being defined as at least one portion of the controlled airspace varying with time; and
transmit a protected ticket comprising information about the space-time region to the UAV or the remote control for the UAV, wherein the protected ticket is based on at least one parameter of the UAV.

14. The apparatus of claim 13, wherein the apparatus is further configured to obtain a clearance for operating in the controlled airspace from an Air Traffic Control, ATC.

15. The apparatus of claim 13, wherein the apparatus is further configured to evaluate the request for permission to operate by verifying whether the UAV is a legitimate compliant device, using a trusted computing technique comprising remote attestation or sealed storage.

16. The apparatus of claim 13, wherein the apparatus is further configured to communicate with the UAV or the remote control for the UAV using security protocols involving authentication of the UAV and/or an operator of the UAV.

17. The apparatus of claim 13, wherein the apparatus is configured to allocate a space-time region of airspace for the UAV to operate in based on at least one of geographical conditions and weather conditions within the controlled airspace.

18. The apparatus of claim 13, wherein the apparatus is further configured to allocate the space-time region of the controlled airspace for the UAV to operate in based on operating performance parameters for the UAV.

19. The apparatus of any of claim 13, wherein the apparatus is further configured to allocate the space-time region of the controlled airspace for the UAV to operate in by issuing a protected ticket for the space-time region, and wherein the apparatus is further configured to transmit a message comprising information about the space-time region by transmitting the protected ticket, wherein the protected ticket is protected from tampering and/or encrypted.

20. The apparatus of claim 13, wherein the apparatus is included in an airspace authority function.

* * * * *